United States Patent
Yokochi et al.

(10) Patent No.: US 7,603,536 B2
(45) Date of Patent: Oct. 13, 2009

(54) DATA PROCESSING APPARATUS AND IMAGE READING APPARATUS

(75) Inventors: Atsushi Yokochi, Chiryu (JP); Noriko Sugimoto, Konan (JP)

(73) Assignee: Brother Kogyo Kabushiki Kaisha (JP)

( * ) Notice: Subject to any disclaimer, the term of this patent is extended or adjusted under 35 U.S.C. 154(b) by 544 days.

(21) Appl. No.: 11/476,605

(22) Filed: Jun. 29, 2006

(65) Prior Publication Data

US 2007/0005924 A1    Jan. 4, 2007

(30) Foreign Application Priority Data

Jun. 30, 2005    (JP) .............................. 2005-192950

(51) Int. Cl.
*G06F 13/00* (2006.01)
*G06F 12/00* (2006.01)

(52) U.S. Cl. ............................. 711/169; 711/150; 711/2

(58) Field of Classification Search ...................... 711/2, 711/150, 169
See application file for complete search history.

(56) References Cited

U.S. PATENT DOCUMENTS

| 6,381,686 B1 * | 4/2002 | Imamura ..................... 711/203 |
| 6,393,520 B2 | 5/2002 | Yoshikawa et al. |
| 6,678,065 B1 * | 1/2004 | Hikawa ...................... 358/1.13 |

FOREIGN PATENT DOCUMENTS

| JP | 61-227475 A | 10/1986 |
| JP | 5-046473 | 2/1993 |
| JP | 7-273931 A | 10/1995 |
| JP | 11-003324 | 1/1999 |
| JP | 11-003324 A | 1/1999 |
| JP | 2003-061029 A | 2/2003 |
| JP | 2004-110299 A | 4/2004 |

OTHER PUBLICATIONS

Notification of Reasons for Rejection mailed Sep. 25, 2007 in Japanese Application No. 2005-192950 and English Translation thereof.

* cited by examiner

*Primary Examiner*—Matt Kim
*Assistant Examiner*—Mardochee Chery
(74) *Attorney, Agent, or Firm*—Banner & Witcoff, Ltd.

(57) ABSTRACT

A data processing apparatus includes a data processing section that issues a plurality of data transfer requests simultaneously; an internal memory provided inside a circuit including the data processing section; an internal memory control section that performs an access control for the internal memory; an external memory that exchanges data with the data processing section via an external bus; an external memory control section that performs an access control for the external memory; and a memory selecting section that assigns to at least one of the internal memory and the external memory a data transfer request from the data processing section.

11 Claims, 8 Drawing Sheets

DATA PROCESSING APPARATUS AND IMAGE READING APPARATUS

CROSS REFERENCE TO RELATED APPLICATION

This application claims priority from Japanese Patent Application No. 2005-192950, filed on Jun. 30, 2005, the entire subject matter of which is incorporated herein by reference.

1. Technical Field

Aspects of the present invention relate to a data processing apparatus having a data processing section which processes plural data transfer requests simultaneously using an internal memory and an external memory.

2. Background

Data processing apparatus are known in which a memory such as a DRAM to and from which data are to be written and read is provided in the same chip as a data processing circuit is provided. Such a memory is called an internal memory or a built-in memory (the term "internal memory" used hereinafter). With the internal memory, a bus for data exchange with the data processing circuit can be made short and widen a width in bit and enable to transfer data at high speed.

A memory such as a DRAM, which is provided separately from a data processing circuit and with which data can be exchanged via an external bus, is called an external memory. The external memory is accessed by a CPU, the data processing circuit, etc. Therefore, the external bus is used when the CPU, the data processing circuit, or some other circuit accesses the external memory. In general, the rate of a data transfer from the data processing circuit to the external memory via the external bus is slower than that from the data processing circuit to the internal memory. On the other hand, the external memory has an advantage that memory expansion can be made easily.

For example, where a data processing apparatus having an internal memory is used as a data processing apparatus for processing data of a read-out image of an image reading apparatus, the speed of processing data of a read-out image can be increased and high-speed copying, for example, can thereby be realized.

For example, image reading apparatus are incorporated in multi-function devices or the like and used for implementing a scanner function, a copy function, a facsimile function, etc. In recent years, with the increase in the performance of multi-function devices as exemplified by high-resolution image reading and color copying, image reading apparatus have also been increased in performance, as a result of which data processing apparatus have come to perform a larger number of kinds of data processing and process larger amounts of image data.

Further, it is difficult to change the capacity of the internal memory, though it is often the case that a request for increasing or decreasing the capacity of the internal memory from a value that was determined at a circuit designing stage of a data processing apparatus is made due to, for example, a later alteration to a product specification. In contrast, with the external memory, memory expansion due to an alteration to a product specification can be made easily. Further, a cost increase due to memory expansion is smaller than in the case of the internal memory. Based on the above consideration, a data processing apparatus having both of an internal memory and an external memory has been proposed (see JP-A-11-3324).

SUMMARY

Where a data processing apparatus is applied to a multi-function device, the data processing apparatus performs, in addition to data processing for image reading, various kinds of processing for the printer function, the facsimile function, etc. And it is not appropriate to occupy, to perform data processing for image reading, the external bus that is provided for access to the external memory.

On the other hand, where a line image sensor such as a CIS (contact image sensor) or a CCD (charge-coupled device) is used as an image sensor of an image reading apparatus, it is necessary to complete one-line data processing (to data output to a memory) without interruption. Therefore, it is desirable that priority is given to access to the external memory for data processing for image reading over access to the external memory from the CPU, for example. However, if the external memory is accessed successively for data processing for image reading, access to the external memory from the CPU, for example, is suspended for an unduly long time, which results in a problem that the response speed of the entire system is made low.

Image data that have been subjected to data processing for image reading are stored temporarily in the external memory that is used as a line buffer, and are then subjected to image processing such as filter processing, a color conversion, and error diffusion processing. As described above, where priority is given to access to the external memory for data processing for image reading, later-occurring image processing is suspended. This results in the following problem. In the case of copying in a multi-function device, the processing speed of the entire copy processing cannot be increased even if the speed of image reading is increased, because later-occurring image processing etc. are suspended.

Aspects of the present invention provide a data processing apparatus being capable of realizing high-speed data processing with a small-capacity internal memory by utilizing the internal memory and an external memory effectively and having a data processing section which performs plural pieces of data processing simultaneously using the internal memory and the external memory.

Also, aspects of the invention provide a data processing apparatus which makes it possible to assign data transfer requests to both of the internal memory and the external memory.

Further, aspects of the invention provide a data processing apparatus that performs high-speed data processing without occupying an external bus.

According to an aspect of the invention, there is provided a data processing apparatus including: a data processing section that issues plural data transfer requests simultaneously; an internal memory provided inside a circuit including the data processing section; an internal memory control section that performs an access control for the internal memory; an external memory that exchanges data with the data processing section via an external bus; an external memory control section that performs an access control for the external memory; and a memory selecting section that assigns to at least one of the internal memory and the external memory a data transfer request from the data processing section.

According to the data processing apparatus, the memory selecting section can assign a data transfer request of each of pieces of data processing of the data processing section to one or both of the internal memory and the external memory. An area of the internal memory is not assigned data transfer requests redundantly. It is made possible to use both of the internal memory and the external memory for one data transfer request. High-speed data processing can be realized even with an internal memory having a small capacity by using the internal memory and the external memory effectively. Further, high-speed data processing can be realized without the external bus's being occupied by the data processing section.

DETAILED DESCRIPTION

Figure 1:
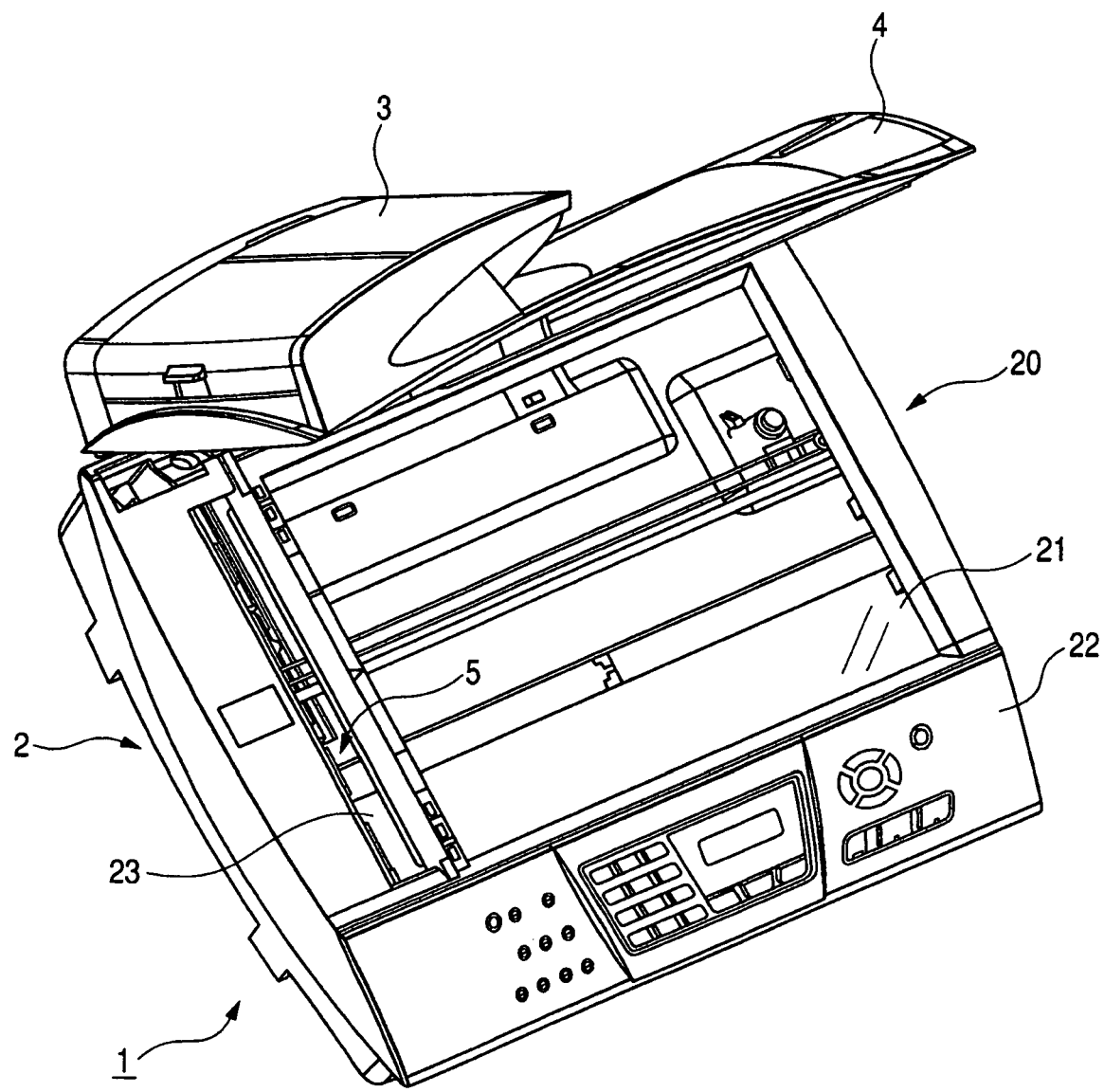
FIG. 1 is a perspective view showing an appearance of an image reading apparatus according to an aspect of the present invention.

An aspect of the present invention will be hereinafter described by referring to the drawings when necessary. A data processing apparatus 30 described below is just one aspect of the invention. That is, the invention is not limited to the following aspect and it goes without saying that the configuration can be modified without departing from the spirit and scope of the invention.

FIG. 1 shows an appearance of an image reading apparatus 1 relating to the aspect of the invention. For example, the image reading apparatus 1 is used as a scanner section of a multi-function device (MFD) in which a printer function and a scanner function are provided in an integral manner or as an image reading section of a copier.

As shown in FIG. 1, in the image reading apparatus 1, a document cover 4 which is equipped with an auto document feeder (ADF) 3 is attached, in an openable and closable manner, to a reading document placement stage 2 which functions as a flat bed scanner (FBS). In the reading document placement stage 2, a platen glass 21 is provided on the top surface of a case 20 which generally assumes a rectangular parallelepiped shape and an image reading unit 5 is housed in the case 20. A document sheet placed on the platen glass 21 is fixed when the document cover 4 is closed. The document sheet is scanned with the image reading unit 5 to perform image reading.

An operating panel 22 is provided so as to arrange a front portion of the reading document placing table 2. The operating panel 22 is composed of various manipulation buttons and a liquid crystal display section. The image reading apparatus 1 operates according to instructions that are input through the operating panel 22. Where the image reading apparatus 1 is implemented as an MFD, the image reading apparatus 1 operates according to instructions that are received, via a scanner driver or the like, from a computer connected to it in addition to instructions that are input through the operating panel 22.

The document cover 4 is equipped with the ADF 3 which transports document sheets successively from a document tray to a sheet ejection tray. In a process of a transport by the ADF 3, the image of a document sheet is read by the image reading unit 5 from under the platen 23 as the document sheet passes on the platen 23. However, the ADF 3 is an optional component.

In the image reading unit 5, an image sensor (line image sensor) 24 is mounted on a carriage which is configured so as to be able to be reciprocated parallel with the platen glass 21 by a scanning mechanism such as a belt driving mechanism. The image sensor 24 is an image sensor of what is called a contact type and is generally called "CIS."

Figure 2:
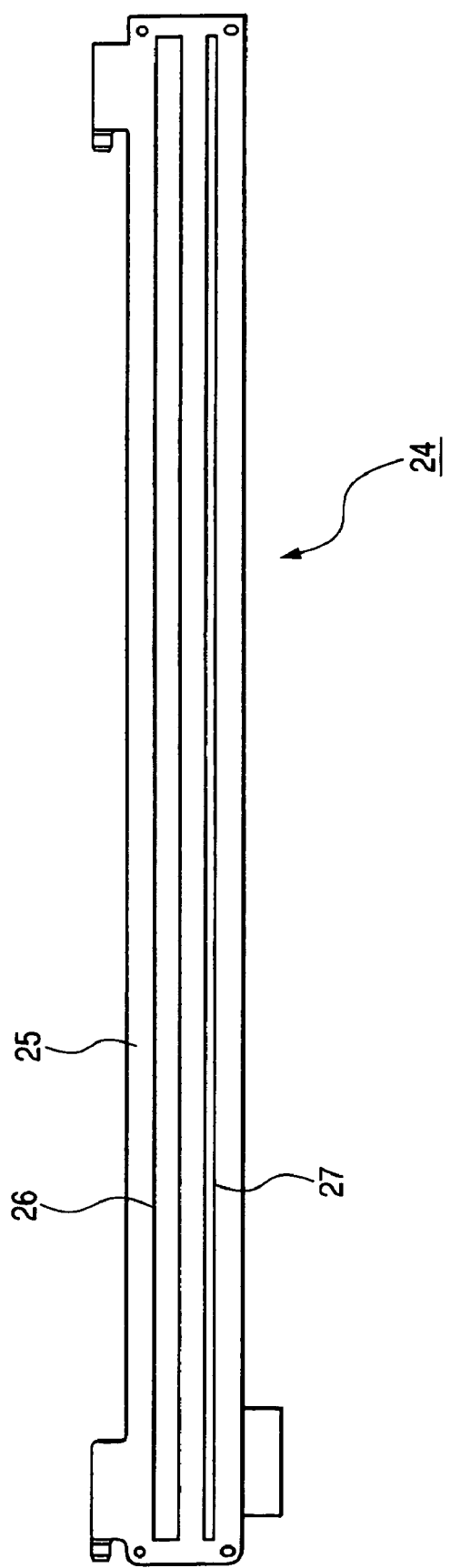
FIG. 2 is a plan view showing an appearance of an image sensor.

As shown in FIG. 2, the image sensor 24 has a rectangular parallelepiped shape whose top surface 25 assumes a long and narrow rectangle in a plan view. A light guide 26 for guiding light emitted from LEDs which are incorporated in the image sensor 24 is disposed on the top surface 25 in the longitudinal direction. Light emitted from the LEDs is output from the light guide 26 so as to travel away from the top surface 25. On the top surface 25, plural condenser lenses 27 are arranged in line in the longitudinal direction, that is, parallel with the light guide 26. In the image sensor 24, plural photoelectric conversion elements are disposed right under the condenser lenses 27 so as to be arranged in the same direction as the condenser lenses 27. Light emitted from the LEDs irradiates on a document to be read and resulting reflection light is condensed onto the photoelectric conversion elements by the condenser lenses 27. The photoelectric conversion elements output image signals in accordance with intensities of the reflection light. In this manner, the image sensor 24 outputs, on a line-by-line basis, image signals corresponding to the image of the document to be read.

Figure 3:
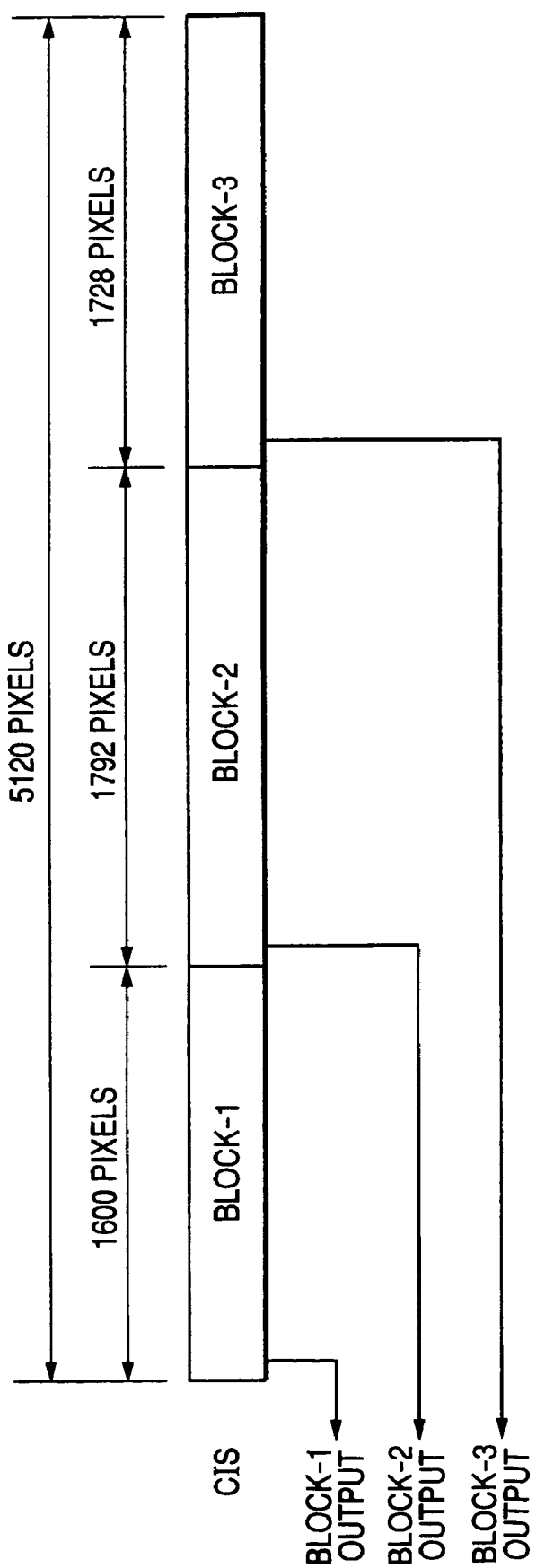
FIG. 3 is a schematic view showing how photoelectric conversion elements of the image sensor are divided.

The photoelectric conversion elements which are arranged in the longitudinal direction of the image sensor 24, that is, in the main scanning direction, are divided into blocks each consisting of an arbitrary number of elements. In this aspect, the photoelectric conversion elements of the image sensor 24 are divided into three blocks. As shown in FIG. 3, 5120 photoelectric conversion elements are arranged in the main scanning direction in the case of 600 dpi. Each photoelectric conversion element corresponds to one pixel of each line. In other words, the one line of the image sensor 24 consists of 5120 pixels. The 5120 pixels of the one line are divided into three blocks, that is, the center block and the two end blocks. The three blocks are called block-1 (ch1), block-2 (ch2), and block-3 (ch3) from the upstream side in the main scanning direction. The upstream side in the main scanning direction means the upstream side in the direction in which the image sensor 24 sequentially outputs image signals of the 5120 pixels, that is, the left side in FIG. 3.

The number of pixels included in each channel can be set arbitrarily. In this aspect, the 5120 pixels of the one line are divided into three blocks in such a manner that block-1, block-2, and block-3 have 1600 pixels, 1792 pixels, and 1728 pixels, respectively. Each of block-1, block-2, and block-3 is provided with an output line through which to output image signals of the photoelectric conversion elements belonging to the block. The image sensor 24 is given a clock signal CLK after a trigger signal TG as a control signal. Image signals of the photoelectric conversion elements belonging to each of block-1, block-2, and block-3 are output in synchronism with the clock signal CLK In other words, the image sensor 24 outputs image signals of block-1, block-2, and block-3 in parallel in synchronism with the clock signal CLK.

The image signals of block-1, block-2, and block-3 are output via the three output lines which are provided so as to correspond to block-1, block-2, and block-3, respectively. In each block, image signals of the respective photoelectric conversion elements are output in such a manner that the photoelectric conversion elements are switched on sequentially starting from the upstream end in the main scanning direction. More specifically, image signals of the first to 1600th pixels are output serially from block-1. Image signals of 1601st to 3392nd pixels are output serially from block-2. Image signals of 3393rd to 5120th pixels are output serially from block-3.

The output lines of the image sensor 24 are electrically connected to a control section of the image reading apparatus 1. For example, the control section of the image reading apparatus 1 is composed of a CPU for performing various kinds of computation, a ROM in which various control programs are stored, a RAM for storing data temporarily, an ASIC (application-specific integrated circuit) for driving various interfaces, driving circuits, etc., and other circuits and sections. The data processing apparatus 30 according to the aspect is implemented as part of the control section.

Figure 4:
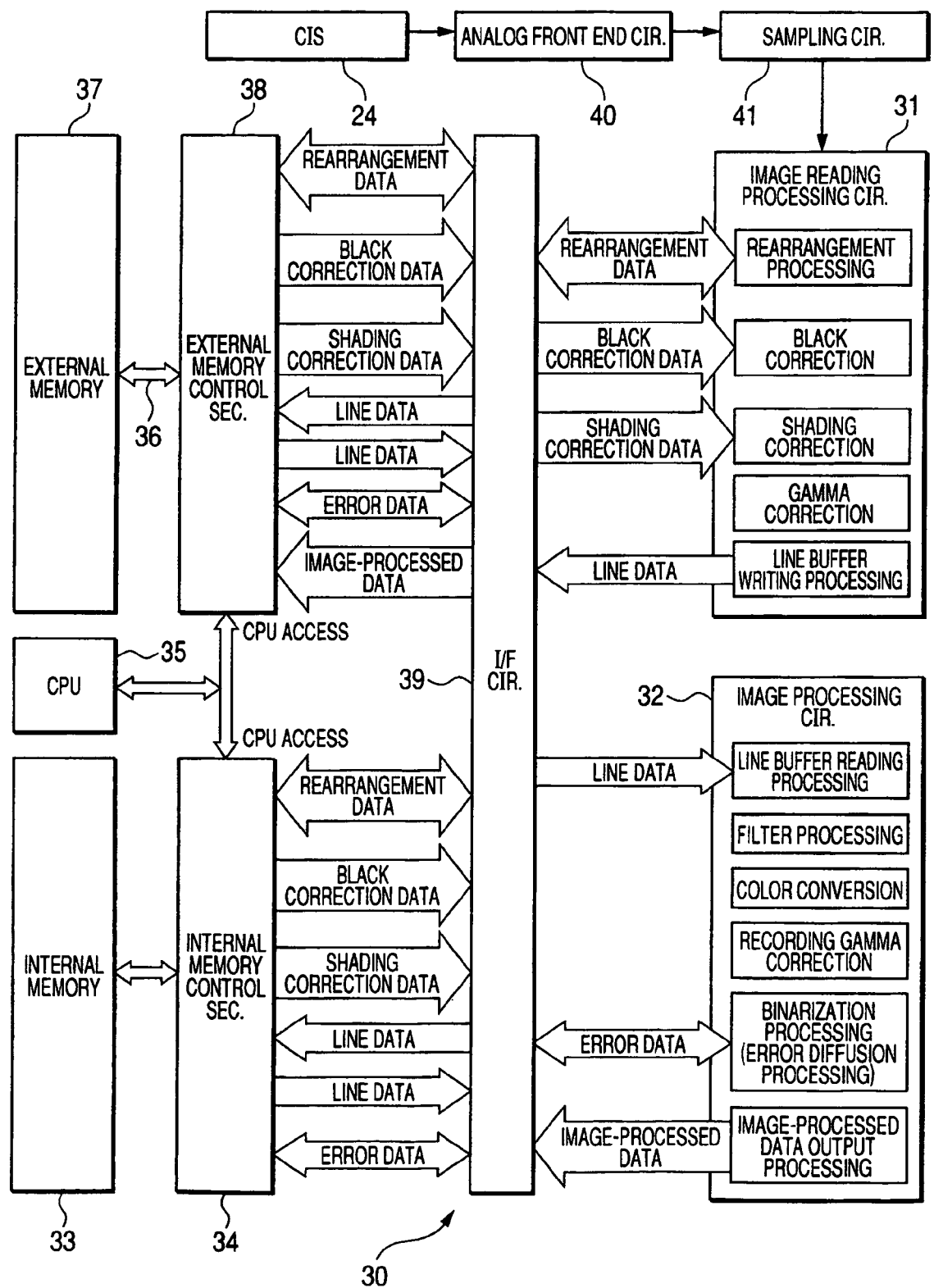
FIG. 4 outlines a configuration of a data processing apparatus.

FIG. 4 shows a main configuration of the data processing apparatus 30. For the sake of convenience of description of the main configuration of the data processing apparatus 30, part of access paths from the CPU, the ROM, etc. to other circuits are omitted in FIG. 4.

The data processing apparatus 30 is equipped with an image reading processing circuit 31 (data processing section) and an image processing circuit 32 (data processing section) for processing image signals that are output from the image sensor 24; an internal memory 33 provided in the same circuit as the circuits 31 and 32 are provided; an internal memory control section 34 for performing an access control for the internal memory 33; an external memory 37 which is provided so as to be able to exchange data with a CPU 35 (central processing unit) etc. via an external bus 36; an external memory control section 38 for performing an access control for the external memory 37; and an interface circuit 39 (memory selecting section) for assigning, to a memory, a data transfer request from the image reading processing circuit 31 or the image processing circuit 32.

Each of the image reading processing circuit 31 and the image processing circuit 32 performs plural pieces of data transfer processing simultaneously and issues plural data transfer requests. As shown in FIG. 4, the image reading processing circuit 31 performs, as a series of pieces of processing, rearrangement processing, a black correction, a shading correction, a gamma correction, line buffer writing processing on image signals that are output from the image sensor 24. These pieces of processing are performed on a series of image signals of each line that are output from the image sensor 24.

The image processing circuit 32 performs line buffer reading processing, filter processing, a color conversion, a recording gamma correction, binarization processing (error diffusion processing), and image-processed data output processing on image data produced by the image reading processing circuit 31.

A detailed description will be made below. Light emitted from the LEDs of the image sensor 24 irradiates on a document to be read and resulting reflection light from the document is condensed by the condenser lenses 27 onto the photoelectric conversion elements which are arranged in the main scanning direction. Each photoelectric conversion element accumulates charge in accordance with the intensity of received light beams. The image sensor 24 receives a clock signal CLK after a trigger signal TG (control signal) which indicates a start of one line. block-1, block-2, and block-3 are switched simultaneously on the basis of the clock signal CLK, whereby image signals corresponding to the intensities of received light beams are output in parallel from three. photoelectric conversion elements of block-1, block-2, and block-3, respectively.

The analog image signals that are output from the image sensor 24 in parallel are sampled and held and then digitized/serialized by an analog front end circuit 40. The digitization means that analog image signals that are output from the image sensor 24 in parallel are converted into digital signals that are digital codes each having a prescribed number of bits. The digitization is performed by an analog-to-digital converter. The serialization is performed by outputting, serially in prescribed order, three image signals that are output from the image sensor 24 in parallel. This is done in such a manner that an analog switch sequentially switches the output lines of the image sensor 24 so as to select one of those each time. Either of the digitization and the serialization may be performed first.

The serialized versions, produced by the analog front end circuit 40, of the image signals of block-1, block-2, and block-3 are sampled by a sampling circuit 41. The sampling circuit 41 samples the image signals of block-1, block-2, and block-3 at prescribed time points when they become stable. The sampling circuit 41 adds, to the sampled image signals, pieces of block information indicating the blocks to which the image signals belong, respectively.

The image signals that are output from the sampling circuit 41 are subjected to the rearrangement processing in the image reading processing circuit 31. More specifically, the image signals are rearranged so as to be line up from the head in the main scanning direction. To write the image signals that are output from the sampling circuit 41 to a memory at prescribed addresses in order to rearrange the image signals, the image reading processing circuit 31 issues a data transfer request to the interface circuit 39. The image reading processing circuit 31 also issues a data transfer request to the interface circuit 39 to read out, in prescribed order, image signals that have been written to the memory. The interface circuit 39 can choose one or both of the internal memory 33 and the external memory 37 as the memory to be used for the rearrangement processing.

The image signals that have been rearranged in the main scanning direction by the rearrangement processing are then subjected to the black correction. The black correction is processing of correcting for variations among the photoelectric conversion elements on the basis of black correction data. The black correction data are acquired by using a reference member or the like and stored in a memory in advance when the image sensor 24 starts reading of the image of a medium to be read. In the black correction, to use the black correction data, the image reading processing circuit 31 issues a data transfer request to the interface circuit 39. The interface circuit 39 can choose one or both of the internal memory 33 and the external memory 37 as the memory to be used for the black correction.

The image signals that have been subjected to the black correction are then subjected to the shading correction. The shading correction is processing of correcting for variations among the photoelectric conversion elements and the light sources on the basis of shading correction data. The shading correction data are acquired by using a reference member or the like and stored in a memory in advance when the image sensor 24 starts reading of the image of a medium to be read.

In the shading correction, to use the shading correction data, the image reading processing circuit 31 issues a data transfer request to the interface circuit 39. The interface circuit 39 can choose one or both of the internal memory 33 and the external memory 37 as the memory to be used for the shading correction.

The image signals that have been subjected to the shading correction are then subjected to the gamma correction. The gamma correction is a gradation correction which is performed to make the relationship between the reading signal and the recording density close to a linear relationship. The gamma correction is performed according to a gamma table which is stored in the memory in advance.

The image signals that have been subjected to the gamma correction are written to the line buffer. To output the image signals to the memory, the image reading processing circuit 31 issues a data transfer request to the interface circuit 39. The interface circuit 39 can choose one or both of the internal memory 33 and the external memory 37 as the memory to which the image signals are to be output. Writing to the line buffer is performed line by line, that is, in such a manner that image signals that are output from the photoelectric conversion elements arranged in the main scanning direction are written each time as one line. The line buffer is configured so as to be able to store line data of four or more lines.

The image signals that have been written to the line buffer are read out by the image processing circuit 32. The read-out image signals are subjected to the filter processing, the color conversion, and the recording gamma correction. The filter processing is processing for, for example, image sharpening and smooth halftone reproduction and includes edge emphasis, smoothing, and moiré elimination. The color conversion is processing of converting image signals that have been produced by the image sensor 24 through color separation into R, Q and B into signals that conform to the spectral characteristics corresponding to the CMYK color space, for example. The recording gamma correction is a gradation correction for making the relationship between the color-converted image signal and the recording density close to a linear relationship. Filter data, a gamma table, etc. which are used in the above pieces of processing and are accessed randomly are not assigned to the internal memory 33.

The image signals that have been subjected to the recording gamma correction are then subjected to the error diffusion processing as the binarization processing. The binarization processing is processing of quantizing multi-value data such as 8-bit data into 1-bit data to produce on/off information for a recording apparatus which expresses densities by on/off dots (ink-jet recording, thermal transfer recording, etc.). The error diffusion processing as the binarization processing is pseudo-gradation processing for expressing density gradation by distributing binarization errors to nearby pixels. In the error diffusion processing, the image processing circuit 32 issues a data transfer request to the interface circuit 39 for input/output of error-diffusion data. The interface circuit 39 can choose one or both of the internal memory 33 and the external memory 37 as the memory to be used in the error diffusion processing. The image signals that have been subjected to the error diffusion processing are written to the external memory 37 as image-processed data.

The internal memory 33 is provided in the same circuit as the image reading processing circuit 31, the image processing circuit 32, the internal memory control section 34, and the interface circuit 39 are provided. For example, the image reading processing circuit 31, the image processing circuit 32, the internal memory control section 34, and the interface circuit 39 are implemented as an ASIC and the internal memory 33 is also formed in the ASIC chip. Formed in the same circuit as the image reading processing circuit 31, the image processing circuit 32, etc. are formed, the internal memory 33 can be accessed at high speed from the image reading processing circuit 31 and the image processing circuit 32. On the other hand, since the capacity of the internal memory 33 needs to be determined at a circuit designing stage, it is difficult to expand the internal memory 33 after forming the above circuit.

The external memory 37 is what is called a RAM and the CPU 35 and other devices can access it via the external bus 36. Although the external memory 37 has a medium access speed, its capacity can be changed in accordance with the specification the apparatus is required to satisfy (e.g., a specification for color copying or monochrome copying) and it can easily adapt to a capacity change that is made after the end of circuit designing.

The external bus 36, which connects the external memory 37 and the external memory control section 38 so as to enable data exchange, has a prescribed width in bits and a prescribed transfer capability. Although it is technically possible to give the external bus 36 a very high transfer capability, it is contradictory to the requirement of realizing the data processing apparatus 30 at as low a cost as possible. In this aspect, the data transfer capability is set so that the time taken by the image reading processing circuit 31 and the image processing circuit 32 to perform data transfers of a series of pieces of data processing when all data transfer requests that are issued by the image reading processing circuit 31 and the image processing circuit 32 in performing pieces of data processing are assigned to the external memory 37 via the external bus 36 by the interface circuit 39 exceeds a prescribed time required.

The bit wide of the external bus 36 is set to 16 bits. The external memory 37 is accessed with the period corresponding to 60 MHz as one clock. Five clocks are necessary for transferring 1-bit data to the external memory 37.

The time taken by the image reading processing circuit 31 and the image processing circuit 32 to perform data transfers of a series of pieces of data processing is described with an assumption that color copying is performed at a resolution of 600 dpi in each of the main and auxiliary scanning directions for an A4-size (8.5 inches×12 inches) document to be scanned. For the sake of convenience of description, one pixel is expressed by 1 byte data. The amount per page of data produced when an A4-size document is scanned under these conditions is calculated as (600 dpi×8.5 inches×600 dpi×12 inches)×3 colors (RGB)=110 MB.

Table 1 shows memory access data amounts that occur in the image reading processing circuit 31 and the image processing circuit 32 in color-copying an A4-size document.

TABLE 1

| No. | Transfer-request-issuing data processing | Data transfer amount per page | Necessary memory capacity | Data transfer amount efficiency |
|---|---|---|---|---|
| 1 | Rearrangement | 220 MB | 5,120 B | 42.9 kB |
| 2 | Black correction | 110 MB | 5,120 B | 21.5 kB |
| 3 | Shading correction | 110 MB | 5,120 B × 3 colors | 7.1 kB |
| 4 | Line buffer writing | 110 MB | 5,120 B × 3 colors × 4 or more lines | 7.1 kB |
| 5 | Line buffer reading | 330 MB | | |
| 6 | Error diffusion | 293 MB | 5,120 B × 4 colors | 14.3 kB |
| 7 | Image data output | 18 MB | 18 MB | |
| Total | | 1,191 MB | | |

If the interface circuit 39 assigns all of the memory access data amount 1,191 MB to the external memory 37, the access time of the external memory 37 is calculated as {(1,191 MB×8 bits)/16 bits/60 MHz}×5=49.6 sec.

Next, assume that the prescribed time required for data transfers by the image reading processing circuit 31 and the image processing circuit 32, more specifically, the time taken to color-copy one page of an A4-size document, is 25 sec. This prescribed time is what is called a product specification required for the image reading apparatus 1. As described above, if all memory accesses necessary for color copying of an A4-size document are assigned to the external memory 37, the prescribed time required, that is, the product specification, cannot be satisfied. Therefore, part of data transfer requests of pieces of data processing to be performed by the image reading processing circuit 31 and the image processing circuit 32 are assigned to the internal memory 33.

If data transfer requests of all pieces of processing to be performed by the image reading processing circuit 31 and the image processing circuit 32 are assigned to the internal memory 33, naturally the pieces of processing can be performed at high speeds. However, this is not appropriate because the capacity of the internal memory 33 becomes unduly large. It is therefore necessary that data transfer requests of pieces of processing to be performed by the image reading processing circuit 31 and the image processing circuit 32 be assigned to the internal memory 33 and the external memory 37 efficiently.

It is not desirable that the external bus 36 is occupied by data transfer requests of pieces of processing that are performed by the image reading processing circuit 31 and the image processing circuit 32. The external memory 37 can also be accessed by the CPU 35 etc., and such memory access is necessary for data processing other than the pieces of processing that are performed by the image reading processing circuit 31 and the image processing circuit 32. Therefore, it is necessary to secure part of the bus bandwidth of the external bus 36 for memory access from the CPU 35 etc. In other words, an upper limit of bus bandwidth of the external bus 36 that can be occupied for data transfer requests from the image reading processing circuit 31 and the image processing circuit 32 is set. In this aspect, the upper limit of bandwidth is set to 70% of a data transfer amount per unit time (second) of the external bus 36. Therefore, the maximum data transfer amount per unit time (second) of the external bus 36 in the bus bandwidth that can be used by the image reading processing circuit 31 and the image processing circuit 32 is calculated as 60 MHz×16 bits×5 clocks×0.7=16.8 MB.

In each piece of data processing performed in the image reading processing circuit 31, the capacity of a data buffer available is an amount corresponding to only several pixels. Therefore, for pieces of data processing to be performed without causing any failure in the system of the data processing device 30, a series of pieces of processing to line buffer writing processing, that is, pieces of data processing of one line, needs to be performed without being suspended. In view of this, in the external memory control section 38, request for data transfer from the image reading processing circuit 31 to the external memory 37 are given higher priority than a request for access from the CPU 35 to the external memory 37.

Table 2 shows priority ranks of various kinds of access to the external memory 37. As shown in Table 2, the priority rank becomes higher as the data processing of the image reading processing circuit 31 goes upstream. The priority rank of access from the CPU 35 is lower than that from the image reading processing circuit 31. As a result, in performing a data transfer to the external memory 37, the image reading processing circuit 31 is not obliged to wait by a request for access to the external memory 37 that is issued by the CPU 35, for example. Therefore, pieces of data processing that correspond to one line of the image sensor 24 are performed by the image reading processing circuit 31 without being interrupted by access from the CPU 35, for example, to the external memory 37.

TABLE 2

| External memory access priority rank | Data processing that requires transfer request |
| --- | --- |
| 1 | Rearrangement |
| 2 | Black correction |
| 3 | Shading correction |
| 4 | Line buffer writing |
| 5 | CPU access |
| 6 | Other kind of access |
| 7 | Line buffer reading |
| 8 | Error diffusion |

To prevent pieces of data processing of the image reading processing circuit 31 from being suspended with related memory accesses as a bottleneck, it is necessary that a sufficient memory bus bandwidth be provided for data transfer requests of the pieces of data processing.

Now assume that the time taken by input of image signals of one line from the image sensor 24 is 700 μsec, the number of pixels of one line is 5,120, and the memory access data amount corresponding to one pixel is 5 bytes. The 5 bytes are required by data writing and reading of rearrangement processing, reading of the black correction data, reading of the shading correction data, and writing to the line buffer. Under the above conditions, the necessary memory bus bandwidth is calculated as 5,120 pixels×5 bytes/700 μsec=36.6 MB/sec. Since as described above the maximum transfer capability of the external bus 36 that can be used by the image reading processing circuit 31 is 16.8 MB/sec, there is a shortage of 19.8 MB in transfer capability.

The interface circuit 39 assigns data transfer requests from the image reading processing circuit 31 and the image processing circuit 32 to one or both of the internal memory 33 and the external memory 37. That is, the memory (one or both of the internal memory 33 and the external memory 37) to be used for data transfer requests from the image reading processing circuit 31 and the image processing circuit 32 is determined collectively by the interface circuit 39.

The interface circuit 39 is provided so as to be able to exchange data with the image reading processing circuit 31 and the image processing circuit 32 as well as the internal memory control section 34. Therefore, the image reading processing circuit 31 and the image processing circuit 32 can write and read data to and from the internal memory 33 via the interface circuit 39 and the internal memory control section 34. Further, the interface circuit 39 is provided so as to be able to exchange data with the external memory control section 38. Therefore, the image reading processing circuit 31 and the image processing circuit 32 can also write and read data to and from the external memory 37 via the interface circuit 39, the external memory control section 38, and the external bus 36.

Figure 5:
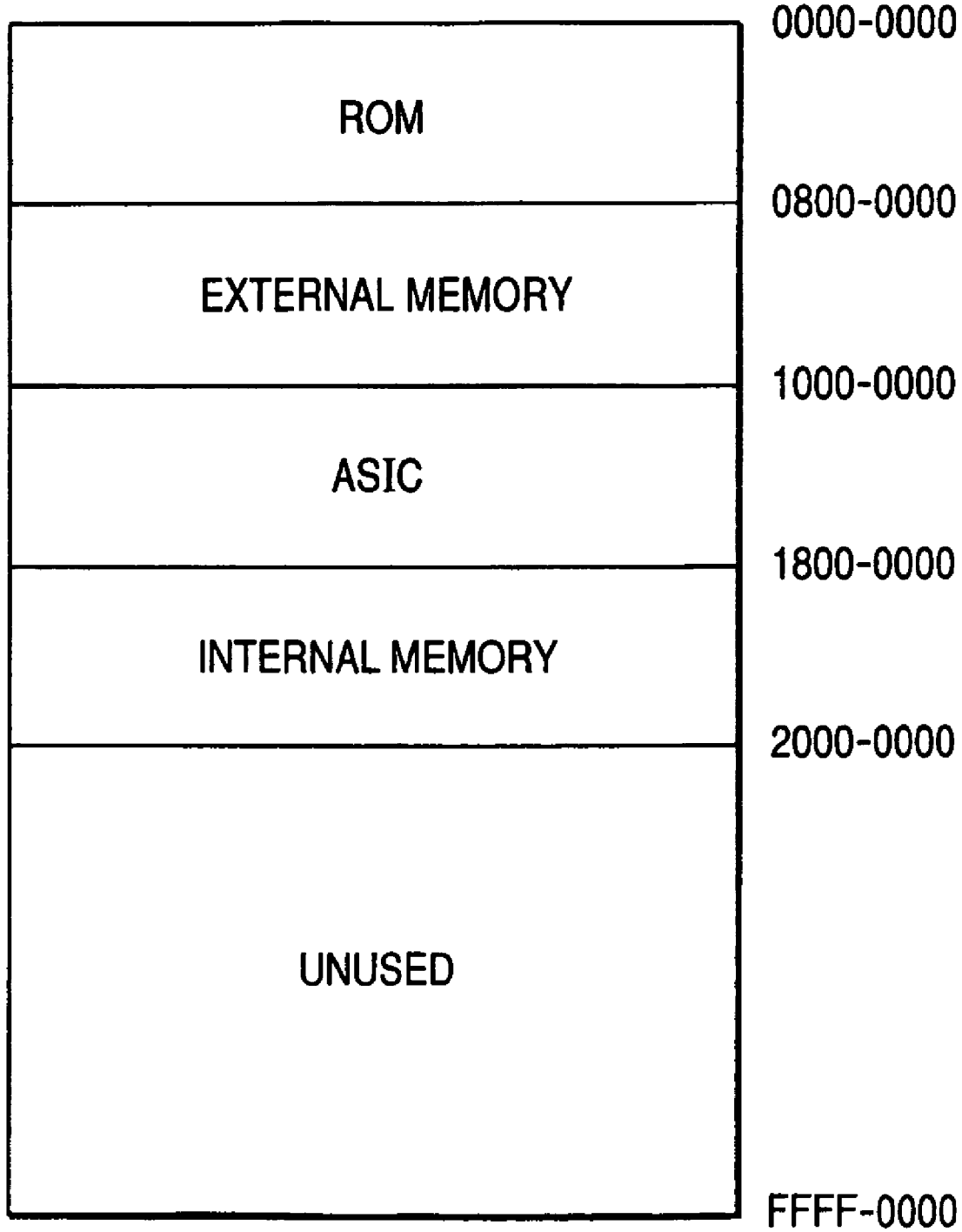
FIG. 5 is a memory map as viewed from a CPU which includes an internal memory and an external memory.
Figure 6:
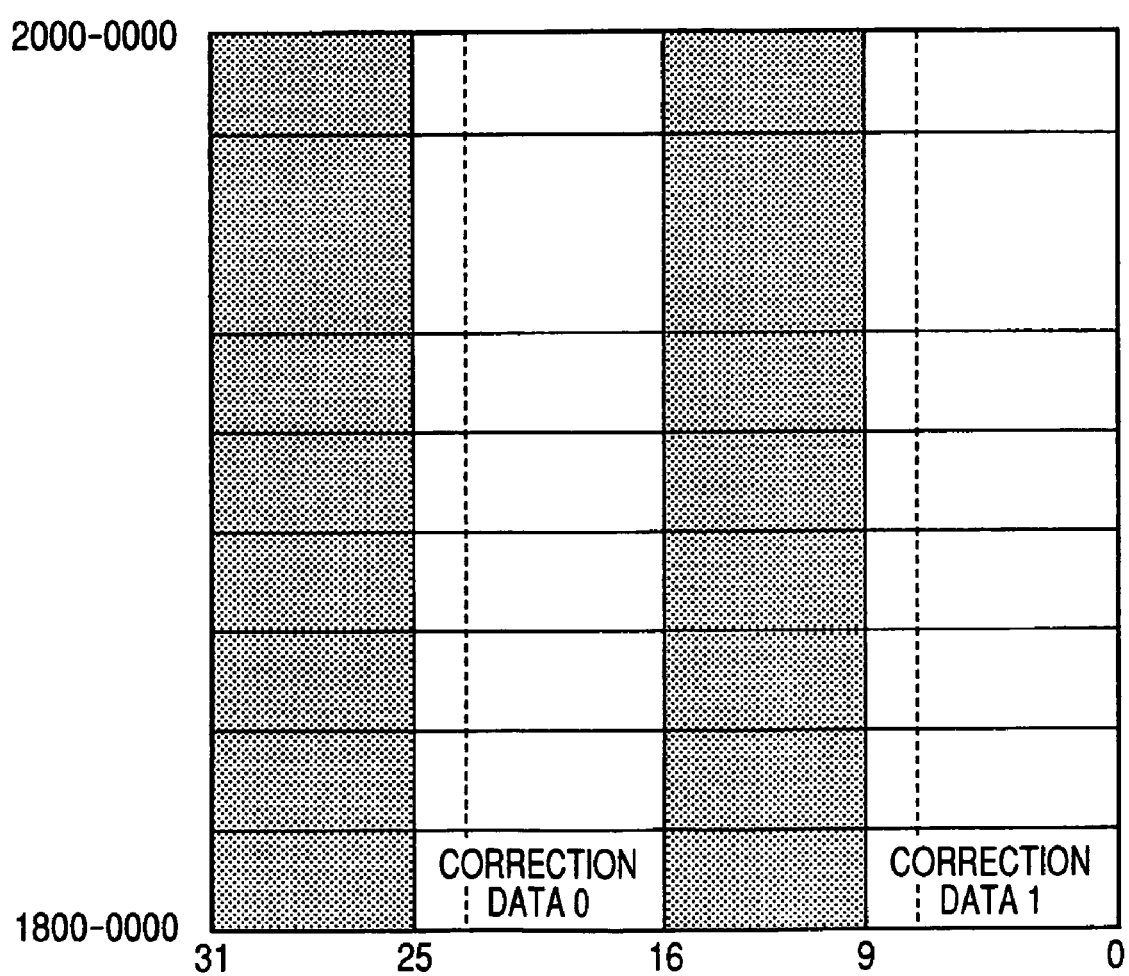
FIG. 6 shows a method of access from the CPU to the internal memory.
Figure 7:
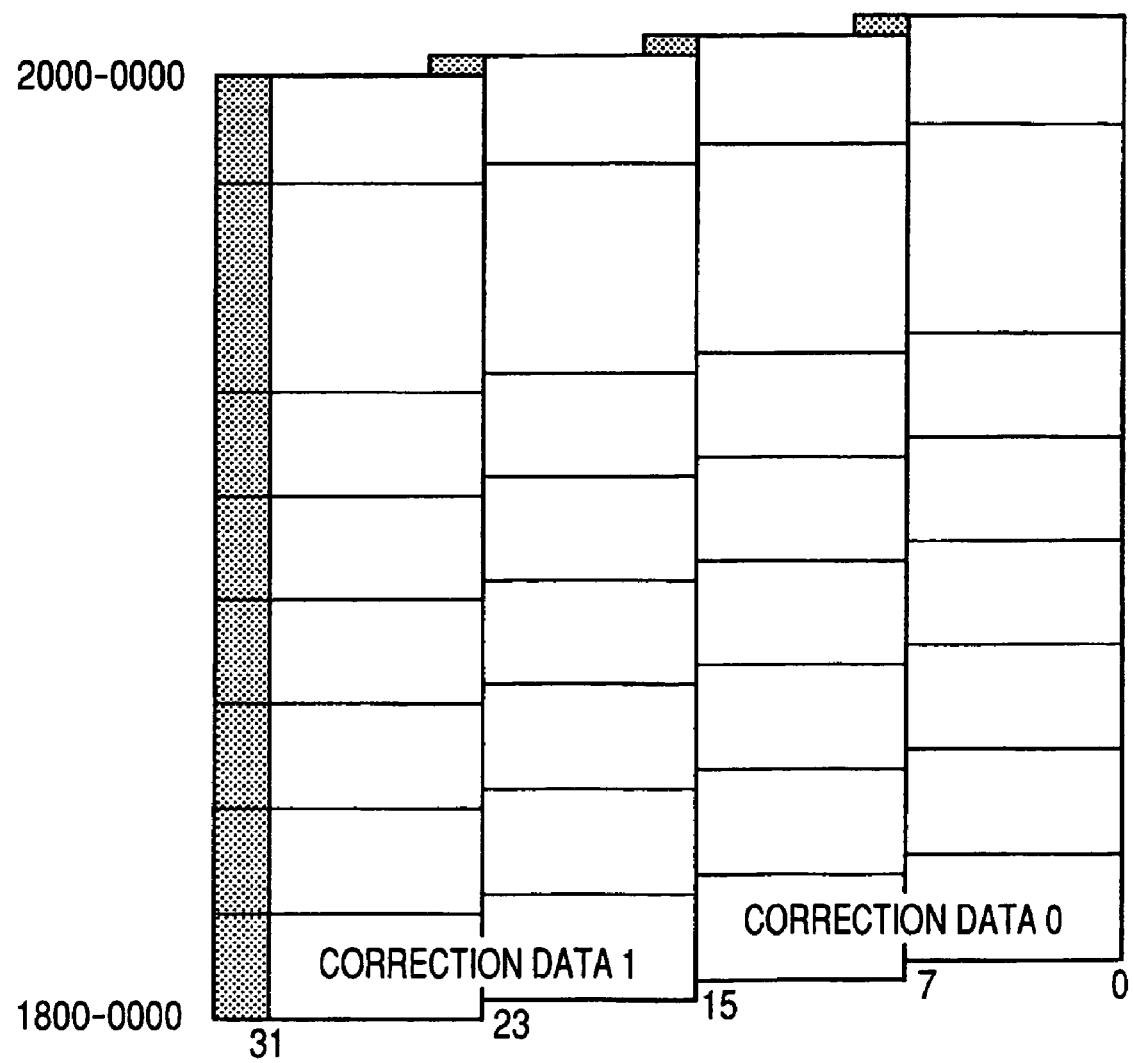
FIG. 7 shows another method of access from the CPU to the internal memory.

The CPU 35 is provided so as to be able to access the internal memory 33 and the external memory 37 via the system bus and the internal memory control section 34 or the external memory control section 38. Therefore, as shown in FIG. 5, the internal memory 33 is assigned to the same map as the external memory 37, the ROM, the ASIC, etc. when viewed from the CPU 35.

Where the bus width of the CPU 35 is 16 bits and the bus width of the internal memory 33 is formed in units of 10 bits for the correction data, memory access from the CPU 35 can be made in two modes. More specifically, the 16-bit bus of the CPU 35 can be connected to either a 10-bit portion of the internal memory 33 as shown in FIG. 6 or two lower 8-bit portions of the internal memory 33 as shown in FIG. 7. In other words, an access mode in which the internal memory 33 is handled as an 8-bit memory and an access mode in which the internal memory 33 is handled as a 10-bit memory are available. This increases the accuracy of calculation involving the correction data etc. by using the 10-bit portion of the bus width of the internal memory 33 rather than its 8-bit portion as well as facilitates access to the internal memory 33.

A description will now be made of how data transfer requests from the image reading processing circuit 31 and the image processing circuit 32 are assigned to the internal memory 33 and the external memory 37.

First, as described above, it is necessary that data transfer requests be assigned to the memories 33 and 37 so that the predetermined bus bandwidth of the external memory 36 is not exceeded. This is to prevent an event that the external bus 36 is occupied by data transfers from the image reading processing circuit 31, which might otherwise occur because access from the image reading processing circuit 31 to the external memory 37 is given priority over access from the CPU 35, for example, to the external memory 37. Therefore, it is necessary that transfer requests be assigned to the external memory 37 within the confines of the maximum allowable data transfer capability 16.8 MB/sec of the external bus 36.

Further, as described above, the prescribed time required for data transfers from the image reading processing circuit 31 and the image processing circuit 32 may need to be satisfied. That is, the product specification that one page of an A4-size document should be color-copied in 25 sec needs to be satisfied. Since the maximum transfer capability of the external bus 36 is 24 MB/sec, the amount of data that can be transferred in 25 sec is 600 MB. Therefore, the amount of data that are assigned to the external memory 37 needs to be 600 MB or less.

Still further, it is necessary that the capacity of the internal memory 33 be made as small as possible. As described above, the memory bus bandwidth that is necessary for processing image signals of one line from the image sensor 24 is 36.6 MB/sec and the maximum allowable transfer capability of the external bus 36 is 16.8 MB/sec. Therefore, data transfers corresponding to the shortage capability 19.8 MB/sec are assigned to the internal memory 33. To minimize the capacity of the internal memory 33, data transfer requests having large transfer amount efficiency values are assigned to the internal memory 33. That is, the internal memory 33 comes to have such a memory capacity as to be able to handle assigned data transfer requests having large transfer amount efficiency values.

The external memory 37 is assigned data transfer requests from the image reading processing circuit 31 and the image processing circuit 32 having small transfer amount efficiency values so that as large a part as possible of the allowable bus bandwidth of the external bus 36 is used. Among data transfer requests from the image reading processing circuit 31 and the image processing circuit 32, residual ones that cannot be assigned to the external memory 37 are assigned to the internal memory 33.

Since transfer requests having small transfer amount efficiency values are assigned to the external memory 37 preferentially, residual transfer requests assigned to the internal memory 33 come to have large transfer amount efficiency values. Since data transfer requests are assigned to the external memory 37 so that as large a part as possible of the allowable bus bandwidth of the external bus 36 is used, the data amount of data transfer requests assigned to the internal memory 33 is made as small as possible. As a result, the memory capacity of the internal memory 33 can be made small. Further, since transfer requests are assigned to the external memory 37 within the confines of the bus bandwidth that is set for the external bus 36, the external bus 36 is not occupied by accesses from the image reading processing circuit 31 to the external memory 37, which prevents a failure in the system of the entire data processing device 30.

A specific description will be made with reference to Table 1. As shown in Table 1, the shading correction and the line buffer writing processing are pieces of data processing having the lowest data transfer amount efficiency. These two pieces of data processing are assigned to the external memory 37. The memory access amount for one pixel that satisfies the allowable bus bandwidth 16.8 MB of the external bus 36 is calculated as (16.8 MB/sec)/(5,120 pixels/700 μsec)=2.29 bytes/pixel. Of the 2.29 bytes/pixel, 2 bytes/pixel is used (i.e., 0.29 byte/pixel remains) if data transfer requests of a shading correction and line buffer writing processing are assigned to the external memory 37. Therefore, not all of plural pieces of data processing performed by the image reading processing circuit 31 can be assigned to the external memory 37.

In this case, among the unassigned data transfer requests, a data transfer request having low data transfer amount efficiency is assigned to the external memory by an amount corresponding to the unused, residual bus bandwidth. The other part of the above data transfer request is assigned to the internal memory 33. That is, the data transfer request of one piece of data processing is assigned to both of the external memory 37 and the internal memory 33. The unassigned, residual data transfer requests among the data transfer requests of the plural pieces of data processing to be performed by the image reading processing circuit 31 are assigned to the internal memory 33.

A more specific description will be made below. The unassigned pieces of data processing are the rearrangement processing, the black correction, and the error diffusion processing. Among the data transfer requests of those pieces of data processing, the data transfer request of the error diffusion processing is the lowest in data transfer amount efficiency. Therefore, the data transfer request of the error diffusion processing is assigned to the external memory 37 and the internal memory 33 at a ratio of 0.29:0.71. As a result, as large a part as possible of the maximum allowable transfer capability 16.8 MB of the external bus 36 is used.

Under the above-described conditions, among the data transfer requests of the pieces of data processing of the image reading processing circuit 31, the data transfer requests of the rearrangement processing and the black correction and part of the data transfer request of the error diffusion processing are assigned to the internal memory 33 and the data transfer requests of the shading correction and the line buffer writing processing, and the other part of the data transfer request of the error diffusion processing are assigned to the external memory 37. As a result, the pieces of processing corresponding to one line of the image sensor 24 are performed by the image reading processing circuit 31 without interruption and no system failure occurs in the data processing device 30.

Among the data transfer requests of the pieces of data processing of the image processing circuit 32, those of the line buffer reading processing and the image data output processing need to be assigned to one or both of the internal memory 33 and the external memory 37. The priority rank of access to the external memory 37 of these pieces of data processing is lower than that of access from the CPU 35, for example. Therefore, even if the data transfer requests of all of these pieces of data processing are assigned to the external memory 37, it is not a factor of causing a system failure in the data processing device 30. However, if a piece of data processing of the image processing circuit 32 is suspended because of memory access for another kind of processing, the prescribed time that is required for the data transfers of the image reading processing circuit 31 and the image processing circuit 32 cannot be satisfied.

A more specific description will be made below. To satisfy the product specification that one page of an A4-size document should be color-copied in 25 sec, the transfer data amount that can be assigned to the external memory 37 amounts to 600 MB. Under the above-described conditions, among the data transfer requests of the pieces of data processing of the image reading processing circuit 31, the data transfer requests of the shading correction and the line buffer writing processing, and part of the data transfer request of the error diffusion processing are assigned to the external memory 37. If the data transfer requests of the line buffer reading processing and the image data output processing among the pieces of data processing of the image processing circuit 32 are assigned to the external memory 37, the amount of data transferred to the external memory 37 is calculated as 110 MB (shading correction)+110 MB (line buffer writing processing)+293 MB×0.29 (part of error diffusion processing)+330 MB (line buffer reading processing)+18 MB (image data output processing)=652.97 MB. Therefore, the required product specification can be satisfied by assigning the internal memory 33 about 52.97 MB that is the excess part over 600 MB.

If an additional part (specifically, about 0.19) of the data transfer request of the error diffusion processing having the highest transfer amount efficiency among the pieces of data processing whose data transfer requests are assigned to the external memory 37 as described above is assigned to the internal memory 33, the amount of data transferred to the external memory 37 becomes 110 MB (shading correction)+110 MB (line buffer writing processing)+293 MB×(0.29−0.19) (part of error diffusion processing)+330 MB (line buffer reading processing)+18 MB (image data output processing) =597.3 MB. In this case, the required product specification is satisfied. The total necessary capacity of the internal memory 33 is calculated as 5,120 B (rearrangement processing)+5,120 B (black correction)+5,210×4×0.9 (part of error diffusion processing)=28,672 B.

How to assign data transfer requests of the pieces of data processing of the image reading processing circuit 31 and the image processing circuit 32 to the internal memory 33 and the external memory 37 is set in the interface circuit 39 in the above-described manner. Therefore, interface circuit 39 can assign data transfer requests to both of the internal memory 33 and the external memory 37.

Figure 8:
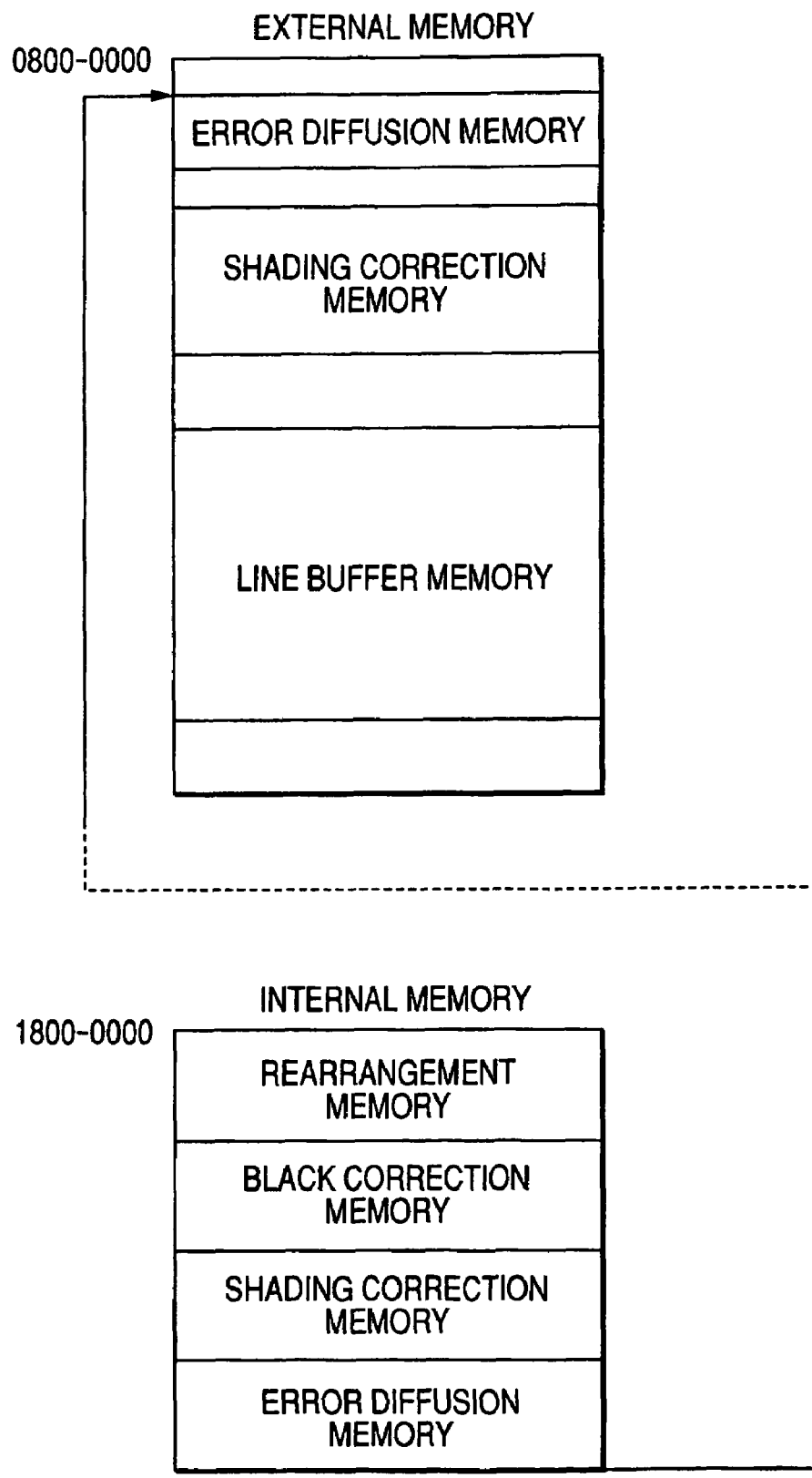
FIG. 8 shows addresses of the internal memory and the external memory that are assigned to pieces of data processing.

To be able to assign one data transfer request to both of the internal memory 33 and the external memory 37, the interface circuit 39 has a series of memory addresses for the internal memory 33 and the external memory 37 as shown in FIG. 8. More specifically, the interface circuit 39 has an upper limit address of the internal memory 33 for data processing such as error diffusion processing whose data transfer request is assigned to both of the internal memory 33 and the external memory 37. When the memory address of access to the internal memory 33 exceeds the upper limit address, the access destination is switched to the external memory 37.

This facilitates the switching from the internal memory 33 to the external memory 37. Managing the internal memory 33 and the external memory 37 using a series of memory addresses prevents an event that data transfer requests are assigned redundantly to the same area of the internal memory 33. The same advantage can be obtained by setting an offset address for data processing in which writing to and reading from both of the internal memory 33 and the external memory 37 are requested.

Where both of the internal memory 33 and the external memory 37 are used for a data transfer request of error diffusion processing of the image processing circuit 32, the interface circuit 39 may alternately enable access to the internal memory 33 and the external memory 37 at a prescribed ratio.

The access speed of the external memory 37 is lower than that of the internal memory 33. Reducing the amount of access to the external memory by alternately accessing the internal memory 33 and the external memory 37 prevents an event that accesses to the low-speed external memory 37 determine the speed of a series of pieces of data processing.

As described above, according to the data processing apparatus 30, the interface circuit 39 can assign a data transfer request of each of pieces of data processing of the image reading processing circuit 31 and the image processing circuit 32 to one or both of the internal memory 33 and the external memory 37. An area of the internal memory 33 is not assigned data transfer requests redundantly. And it is made easier to use both of the internal memory 33 and the external memory 37 for one data transfer request. Therefore, pieces of data transfer requests whose priority ranks are higher than the priority ranks of other kinds of memory access from the CPU 35 etc. can be assigned arbitrarily and a system failure can thereby be avoided. Further, since requests of data transfer to the internal memory 33 and the external memory 37 are assigned according to their transfer amount efficiency values, the speed of data processing can be increased whereas the capacity of the internal memory 33 can be made as small as possible.

As was described, the data processing apparatus according to an aspect of the invention includes a data processing section which issues plural data transfer requests simultaneously; an internal memory provided inside a circuit including the data processing section; an internal memory control section for performing an access control for the internal memory; an external memory which is provided so as to exchange data with the data processing section via an external bus; an external memory control section for performing an access control for the external memory; and a memory selecting section for assigning, to one or both of the internal memory and the external memory, a data transfer request from the data processing section.

In performing plural pieces of data processing, the data processing section issues a request of data transfer to the external memory or the internal memory to store data before or after processing or to read data that are necessary for processing. The external memory control section and the internal memory control section perform access controls for the external memory and the internal memory, respectively. The memory selecting section assigns, to one or both of the internal memory and the external memory, a data transfer request issued by the data processing section for each piece of processing. This configuration makes it possible to assign each data transfer request to both of the internal memory and the external memory.

The data processing section may be such as to perform a series of pieces of data processing, and the memory selecting section may such as to assign, to the external memory, data transfer requests from the data processing section whose transfer amount efficiency values as data transfer amounts per unit memory capacity are small so that as large a part of a bus bandwidth set for the external bus as possible is used, and assigns to the internal memory, the unassigned data transfer requests from the data processing section.

For example, "a series of pieces of processing" is pieces of processing including various kinds of corrections such as a black correction and a shading correction which are performed successively on image data of one line obtained by reading with a line image sensor, the pieces of processing being ended by storage of resulting data into a line buffer.

The term "transfer amount efficiency" means a data transfer amount per unit memory capacity of a data transfer request, and is lower when the data transfer amount per unit memory capacity is smaller.

Since data transfer requests having smaller transfer amount efficiency values are assigned to the external memory, the other data transfer requests assigned to the internal memory come to have large transfer amount efficiency values. Further, since data transfer requests are assigned to the external memory so that as large a part of the bus bandwidth set for the external bus as possible is used, the amount of data of data transfer requests assigned to the internal memory is minimized. As a result, the memory capacity of the internal memory can be made small and hence its cost can be reduced. Further, since data transfer requests are assigned to the external memory within the confines of the bus bandwidth that is set for the external bus, the external bus is not occupied by accesses from the data processing section to the external memory and a system failure can thereby be avoided.

The external memory control section may be such that priority ranks of data transfer requests from the data processing section that request data transfer to the external memory are set higher than a priority rank of an access request from a central processing unit that requests access to the external memory.

With this measure, in performing a data transfer to the external memory, the data processing section is not obliged to wait by a request of access from the central processing unit to the external memory. Therefore, a series of pieces of processing of the data processing section is not interrupted by access from the central processing unit to the external memory.

The memory selecting section may be such as to assign, to the external memory, in order, on a data transfer request basis, data transfer requests from the data processing section whose transfer amount efficiency values are small so that as large a part of the bus bandwidth set for the external bus as possible is used, assign, to the external memory, part, corresponding to the unused, residual bus bandwidth, of a data transfer request having low transfer amount efficiency among the unassigned data transfer requests, assign the other part of the data transfer request to the internal memory, and assign, to the internal memory, the residual data transfer requests from the data processing section.

The memory selecting section assigns, to the external memory, in order, on a data transfer request basis, data transfer requests from the data processing section whose transfer amount efficiency values are small so that as large a part of the bus bandwidth set for the external bus as possible is used. When the data transfer requests have been assigned to the external memory, there occurs a residual bus bandwidth that is insufficient for assignment of one data transfer request. Part of a data transfer request having low transfer amount efficiency among the unassigned data transfer requests is assigned to this unused, residual bus bandwidth. The other part of the data transfer request is assigned to the internal memory. The residual data transfer requests are assigned to the internal memory. This measure allows the memory selecting section to assign one data transfer request to both of the internal memory and the external memory.

A data transfer capability of the external bus may be such that a time taken by data transfers requested by the data processing section in performing a series of pieces of data processing exceeds a desired time in the case where all of data transfer requests issued by the data processing section are assigned to the external memory, and the internal memory may have such a memory capacity that data transfer requests having large transfer amount efficiency values can be assigned to the internal memory so that the time taken by the data transfers requested by the data processing section falls within the desired time.

The external bus has a prescribed data transfer capability. The data processing section is required to finish the plural pieces of data processing in a prescribed time. In the case of copying, for example, this requirement is a product specification that is a time in which to perform image processing for color copying of one page of an A4-size document. The data transfer capability of the external bus is such as not to be able to satisfy this requirement in the case where all of data transfer requests of the plural pieces of data processing to be performed by the data processing section are assigned to the external memory.

The internal memory has such a memory capacity that data transfer requests having large transfer amount efficiency values can be assigned to it. The above requirement can be satisfied by assigning these data transfer requests to the internal memory.

The memory selecting section may be such as to have a series of memory addresses for the internal memory and the external memory and have an offset address for a data transfer request of each piece of data processing in which writing to and reading from a memory are requested.

Managing the internal memory and the external memory using a series of memory addresses as mentioned above prevents an event that data transfer requests are assigned redundantly to the same area of the internal memory.

The memory selecting section may be such as to have an upper limit address of the internal memory for data processing that uses both of the internal memory and the external memory, and switch the access destination to the external memory when the memory address of access to the internal memory exceeds the upper limit address.

This facilitates the switching from the internal memory to the external memory.

The memory selecting section may be such as to alternately cause access to the external memory and access to the internal memory at a prescribed ratio for a data transfer request from the data processing section that is assigned to the external memory and the internal memory at the prescribed ratio.

The access speed of the external memory is lower than that of the internal memory. Reducing the amount of access to the external memory by alternately accessing the external memory and the internal memory prevents an event that accesses to the low-speed external memory determine the speed of a series of pieces of data processing.

It is preferable that the data processing section be such as to process image signals that are output from a line image sensor which reads, on a line-by-line basis, an image of a medium to be read.

It is preferable that the data processing section be such as to process, on a line-by-line basis, image signals that are output from the line image sensor.

What is claimed is:

1. A data processing apparatus comprising:
 a data processor that issues a plurality of data transfer requests simultaneously and performs a series of data processing;

a first memory provided inside a circuit including the data processor;

a first memory controller that performs an access control for the first memory;

a second memory that exchanges data with the data processor via a bus;

a second memory controller that performs an access control for the second memory; and a memory selector that assigns to the second memory a data transfer request from the data processor, assigns, to the first memory, unassigned data transfer requests from the data processor, assigns, to the second memory, in order, on a data transfer request basis, data transfer requests from the data processor whose transfer amount efficiency values are low, assigns, to the second memory, part, corresponding to unused, residual bus bandwidth, of a data transfer request having low transfer amount efficiency among the unassigned data transfer requests, the memory selector assigns the other part of the data transfer request having low transfer amount efficiency among the unassigned data transfer requests to the first memory, and assigns, to the first memory, residual data transfer requests from the data processor.

2. The data processing apparatus according to claim 1, wherein, in the second memory controller, priority levels of data transfer requests from the data processor that request data transfer to the second memory are set higher than a priority level of an access request from a central processor that requests access to the second memory.

3. The data processing apparatus according to claim 1, wherein a data transfer capability of the bus is such that a time taken by data transfers requested by the data processor in performing a series of data processing exceeds a predetermined time in a case where all of data transfer requests issued by the data processor are assigned to the second memory, and the first memory has such a memory capacity that data transfer requests having high transfer amount efficiency values can be assigned to the first memory so that the time taken by the data transfers requested by the data processor falls within the predetermined time.

4. The data processing apparatus according to claim 1, wherein the memory selector has a series of memory addresses for the first memory and the second memory and has an offset address for a data transfer request of each piece of data processing in which writing to and reading from a memory are requested.

5. The data processing apparatus according to claim 1, wherein the memory selector has an upper limit address of the first memory for data processing that uses both of the first memory and the second memory, and switches an access destination to the second memory when the memory address of access to the first memory exceeds the upper limit address.

6. The data processing apparatus according to claim 1, wherein the memory selector alternately causes access to the second memory and access to the first memory at a prescribed ratio for the data transfer request from the data processor that is assigned to the second memory and the first memory at the prescribed ratio.

7. The data processing apparatus according to claim 1, wherein the data processor processes image signals that are output from a line image sensor that reads, on a line-by-line basis, an image of a document to be read.

8. The data processing apparatus according to claim 7, wherein the data processor processes, on a line-by-line basis, image signals that are output from the line image sensor.

9. An image reading apparatus comprising:
a line image sensor that scans an image of a document to be scanned; and
a data processing apparatus that comprises:
   a data processor that issues a plurality of data transfer requests simultaneously and performs a series of data processing;
   a first memory provided inside a circuit including the data processor;
   a first memory controller that performs an access control for the first memory;
   a second memory that exchanges data with the data processor via a bus;
   a second memory controller that performs an access control for the second memory; and
   a memory selector that assigns to the second memory a data transfer request from the data processor, assigns, to the first memory, unassigned data transfer requests from the data processor, assigns, to the second memory, in order, on a data transfer request basis, data transfer requests from the data processor whose transfer amount efficiency values are low, assigns, to the second memory, part, corresponding to unused, residual bus bandwidth, of a data transfer request having low transfer amount efficiency among the unassigned data transfer requests, the memory selector assigns the other part of the data transfer request having low transfer amount efficiency among the unassigned data transfer requests to the first memory, and assigns, to the first memory, residual data transfer requests from the data processor,
wherein the data processor processes image signals that are output from the line image sensor.

10. A data processing method for use in an image reading apparatus including a line image sensor that scans an image of a document to be scanned, the method comprising:
issuing a plurality of data transfer requests simultaneously from a data processor; and
assigning a data transfer request from the data processor to a second memory, a first memory provided inside a circuit including the data processor, the second memory exchanging data with the data processor via a bus;
assigning, to the first memory, unassigned data transfer requests from the data processor;
assigning, to the second memory, in order, on a data transfer request basis, data transfer requests from the data processor whose transfer amount efficiency values are low;
assigning, to the second memory, part, corresponding to unused, residual bus bandwidth, of a data transfer request having low transfer amount efficiency among the unassigned data transfer requests;
assigning the other part of the data transfer request having low transfer amount efficiency among the unassigned data transfer requests to the first memory; and
assigning, to the first memory, residual data transfer requests from the data processor.

11. The data processing method according to claim 10, wherein assigning the data transfer request, whose transfer amount efficiency values as data transfer amounts per unit memory capacity are small so that as large a part of a bus bandwidth set for the bus as possible is used, to the second memory, and assigning the unassigned data transfer requests to the first memory.

* * * * *

UNITED STATES PATENT AND TRADEMARK OFFICE
CERTIFICATE OF CORRECTION

PATENT NO. : 7,603,536 B2  Page 1 of 1
APPLICATION NO. : 11/476605
DATED : October 13, 2009
INVENTOR(S) : Yokochi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this

Fifth Day of October, 2010

David J. Kappos
*Director of the United States Patent and Trademark Office*